United States Patent [19]

Oughton

[11] 4,368,152

[45] Jan. 11, 1983

[54] CONTROL OF RESIDUAL SOLVENT IN PROTEINACEOUS MATERIALS

[75] Inventor: Richard W. Oughton, Kingston, Canada

[73] Assignee: Du Pont Canada Inc., Mississauga, Canada

[21] Appl. No.: 258,385

[22] Filed: Apr. 28, 1981

[30] Foreign Application Priority Data

May 15, 1980 [CA] Canada ................................... 352013

[51] Int. Cl.$^3$ ............................................... A23J 1/14
[52] U.S. Cl. ................................. 260/123.5; 426/656; 426/430
[58] Field of Search ..................... 260/123.5; 426/430, 426/656

[56] References Cited

U.S. PATENT DOCUMENTS

| | | | |
|---|---|---|---|
| 3,714,210 | 1/1973 | Schweiger | 260/412.8 |
| 3,966,981 | 6/1976 | Schultz | 426/425 |
| 4,072,669 | 2/1978 | Betschart | 260/125.5 |
| 4,154,728 | 5/1979 | Oughton | 260/123.5 |
| 4,208,260 | 6/1980 | Oughton | 204/180 R |
| 4,211,695 | 7/1980 | Oughton | 260/123.5 |

FOREIGN PATENT DOCUMENTS 1052170  4/1979  Canada .

OTHER PUBLICATIONS

White A. et al., *Principles of Biochemistry*, pp. 161–162, McGraw-Hill Book Co., N.Y. 1954.
Mustakas, G. et al., J. Amer. Oil Chem. Soc., vol. 38, pp. 473–478 1961.

*Primary Examiner*—Allan Lieberman
*Assistant Examiner*—P. Short

[57] ABSTRACT

An improvement in a process for the treatment of proteinaceous material, wherein the proteinaceous material is admixed with a hydrocarbon solvent for any oil in the proteinaceous material and at least a fraction of the proteinaceous material is separated from the solvent and treated for removal of residual solvent, is disclosed. The improvement is characterized by (a) maintaining the temperature of the admixture of proteinaceous material and solvent in the range 0°–35° C., and (b) controlling the period of the time of contact of solvent and proteinaceous material and the period of the time of treatment for removal of residual solvent, whereby separation of a product having a level of residual solvent of less than 60 ppm may be effected. The proteinaceous material may be comminuted soya beans or rapeseed. Products having low residual solvent may be obtained. Such products may be used in the food industry.

12 Claims, No Drawings

CONTROL OF RESIDUAL SOLVENT IN PROTEINACEOUS MATERIALS

BACKGROUND

1. Field of the Invention

The present invention relates to the control of the amount of residual solvent in proteinaceous materials and in particular to the control of the amount of residual solvent in comminuted proteinaceous materials that have been admixed with hydrocarbon solvent in a process for the separation of oil therefrom and/or in a process for the separation of fractions differing in protein content.

As used herein, proteinaceous material consists of soya beans and rapeseed. The outer coat of the proteinaceous material, which is also known as bran or the seed coat, may have endosperm attached thereto. The expression "gum" used herein refers in particular to water-soluble gums, if present in the particular proteinaceous material.

The proteinaceous materials are a potential source of a wide variety of useful products. Examples of such products are flour, starch, protein-enriched and protein-depleted products, bran, gum and oil, depending on the particular proteinaceous material. Traditional techniques used in the food processing industry, if available, for the treatment of proteinaceous material so as to effect the separation of the proteinaceous material into fractions of differing composition are capable of improvement, for example, with respect to energy requirements, potential pollution problems and the taste and/or color of products. In other instances, techniques may not be available for the conversion of the proteinaceous material into commercially viable products, for example, products of increased protein content.

2. Description of the Prior Art

Processes for the separation of proteinaceous material into fractions, especially proteinaceous fractions, in which the comminuted proteinaceous material or fractions thereof are admixed with hydrocarbon solvents for any oil in the material, are known. Such processes are disclosed by R. W. Oughton in U.S. Pat. Nos. 4,154,728, issued May 15, 1979, and 4,208,260, issued June 17, 1980.

The use of hydrocarbon solvents, especially hexane, in order to de-oil proteinaceous materials containing oil, e.g., soya beans and cottonseed, is known. Moreover, in some countries the amount of residual solvent in the de-oiled material, i.e., the amount of solvent remaining in the de-oiled material after separation from the oil bearing miscella, is subject to government regulation. For instance, under U.S. Food and Drug Administration Regulation No. 172,894, the amount of residual hexane in cottonseed meant for human use must be less than 60 ppm.

Several methods are known for reducing the amount of residual solvent in products that have been in contact with hydrocarbon solvents. For example, de-oiled soya beans have been treated with vacuum or steam or have been heated in ovens to promote evaporation of residual solvent. However, it has been found that even with intensive application of such methods, it is difficult to obtain products containing less than 60 ppm of residual solvent. Moreover, prolonged heating of proteinaceous products tends to result in denaturing of the protein.

A process for reducing the amount of residual solvent in soya beans is disclosed by W. G. Shultz in U.S. Pat. No. 3,966,981, which issued June 29, 1976. In that process, soya beans that contain residual hexane as a result of a de-oiling step, are extracted with liquid carbon dioxide under conditions whereby the carbon dioxide remains in a liquid state. A process for the removal of residual solvent from proteinaceous material, especially isopropanol from fish protein, by treating with air having a temperature of 40°–90° C. and at least 50% relative humidity, is disclosed in Canadian Pat. No. 1,052,170 of T. Knutsen et al., which issued Apr. 10, 1979.

In spite of the methods known in the art, there is a need for an improved process for controlling the amount of residual solvent to a level of less than 60 ppm in products that have been in contact with hydrocarbon solvents.

BRIEF SUMMARY OF THE INVENTION

Surprisingly, it has now been found that the level of residual solvent may readily be controlled at levels of less than 60 ppm by contacting the proteinaceous material with hydrocarbon solvent at a temperature of less than 35° C., especially 0°–35° C., and controlling the time of contact of solvent and material and the time of treatment for removal of residual solvent from the de-oiled product.

Accordingly, the present invention provides an improvement in the process for control of the amount of residual solvent in comminuted proteinaceous material selected from the group consisting of soya beans and rapeseed, in which the comminuted proteinaceous material is admixed with a hydrocarbon solvent for oil in the material and at least a fraction of the proteinaceous material is separated from the solvent and treated for removal of residual solvent, in which the improvement is characterized by:

(a) maintaining the temperature of the admixture of proteinaceous material and solvent in the range of 0°–35° C.; and (b) controlling the period of the time of contact of solvent and proteinaceous material and the period of the time of treatment for removal of residual solvent, whereby separation of a product having a level of residual solvent of less than 60 ppm may be effected.

In a preferred process of the present invention, the treatment for removal of residual solvent involves the use of vacuum.

In another preferred embodiment, the treatment for removal of residual solvent involves the use of steam.

In the process of the present invention, the comminuted fraction of proteinaceous material that is to be separated is in admixture with a solvent, especially a hydrocarbon solvent, for any oil of the material. Such a solvent will facilitate extraction of oil, if present, from the comminuted fraction of proteinaceous material, i.e., the de-oiling of the fraction. The solvent used must be acceptable for use with foodstuffs, e.g., be nontoxic at the levels remaining in the products subsequently produced, and not cause the formation of toxic materials in the product; and not have a significant deleterious effect on the nutritional value of the product. The amount and type of solvent remaining in products offered for sale must be acceptable to the appropriate health authorities, as will be understood by those skilled in the art. Examples of solvents are pentane, hexane, heptane and cyclohexane, and mixtures thereof; as used herein, the solvents hexane and heptane include those solvents referred to in the food industry as hexane and heptane. The preferred solvent is hexane. The present invention will generally be described hereinafter with reference to hexane as the solvent.

In the process of the present invention, the proteinaceous materials are preferably dehulled prior to comminution. Techniques for dehulling the proteinaceous materials are known. The proteinaceous materials are comminuted in order to facilitate extraction of any oil and to facilitate separation of a subsequently formed admixture of comminuted proteinaceious material and solvent into fractions differing in composition. The particle size of the comminuted proteinaceous material will depend in particular on the technique to be used to separate the comminuted proteinaceous material in the admixture into fractions and may affect the segregation of protein in the material. Conventional techniques, for example, pin-milling, hammer-milling and other shearing techniques, would appear to produce an acceptable comminuted proteinaceous material, the preferred techniques depending in particular on the actual separation techniques to be used.

In the process of the present invention, comminuted groat is admixed with solvent, e.g., hexane. Usually the admixing will be such that a slurry of comminuted proteinaceous material in solvent is formed. Such admixing may include one or more steps to effect separation of the comminuted proteinaceous material into fractions differing in composition, especially with regard to the protein content of such fractions. Examples of such steps are given in the aforementioned U.S. patents of R. W. Oughton.

After a period of time the comminuted proteinaceous material, or fractions thereof, is separated from the hexane solvent. The comminuted proteinaceous material, or fractions thereof, will normally be substantially de-oiled, if necessary. The products thus obtained are then subjected to techniques for the removal of residual solvent, i.e., that solvent remaining associated with the products obtained after separation of the products from the solvent miscella. Such techniques may include subjecting the products to the influence of vacuum, steam and/or heat for a period of time. The removal of residual solvent should be carried out under conditions that do not cause significant denaturing of any protein in the products.

Surprisingly, it has been found that the process may readily be controlled so as to provide products having residual levels of solvent, after treatment for removal of residual solvent, of less than 60 ppm and in preferred embodiments less than 30 ppm.

In the first instance, the temperature of the solvent with which the comminuted proteinaceous material is admixed, is controlled at a temperature in the range 0°–35° C. As is exemplified hereinafter, even increasing the temperature of the solvent to about 50° C. results in substantial increases in residual solvent in the products and such increased amounts cannot readily be reduced to less than 60 ppm, let alone less than 30 ppm, by simple techniques.

In addition to controlling the temperature of the solvent, the total time during which the comminuted proteinaceous material is in contact with the solvent, i.e., in the form of the admixture, is also controlled. Preferably such time is the minimum practical time needed to accomplish any de-oiling of the comminuted proteinaceous material and to accomplish any separation of the material into fractions. Preferably the total period of time is less than 120 minutes and in particular less than 80 minutes, although longer times may be used.

The period of time required to reduce the level of residual solvent in fractions separated from the solvent to less than 60 ppm using a particular method for reducing residual solvent, will depend in particular, on the temperature of the solvent and the time of contact of solvent and proteinaceous material. The period of time to reduce the level of residual solvent will normally be in the range 5 to 500 minutes, usually 5 to 100 minutes. An important characteristic of the present invention is that it is possible by normal techniques to reduce the amount of residual solvent to less than 60 ppm in reasonable times. As exemplified hereinafter, if higher solvent temperatures are used, i.e., higher than 35° C., even treatment for more than 1400 minutes may not result in residual solvent levels of less than 60 ppm. At temperatures of, for example, 50° C. and higher, the levels of residual solvent obtained may be substantially greater than 60 ppm and, moreover, may show little tendency of decreasing to below 60 ppm on extended treatment for removal of solvent.

The period of time required to reduce the level of residual solvent according to the process of the present invention to less than 60 ppm, may depend on the nature of the fraction of proteinaceous material separated from the solvent, especially on the protein content of that fraction. The level of residual solvent may be more readily reduced in fractions having a relatively low protein content than in fractions having a relatively high protein content. Although the process of the present invention may be used on fractions of proteinaceous material having a low or high protein content, in a preferred embodiment the fraction has a protein content in excess of 50%.

The maximum period of time during which the comminuted proteinaceous material may be in contact with solvent, while still providing products having a residual solvent of less than 60 ppm, is related to the temperature of the solvent and the method used in the treatment of the product for the removal of residual solvent. At higher temperatures within the range 0°–35° C., shorter contact times of solvent and proteinaceous material should be used. Moreover, some methods of treatment e.g., the use of steam and/or pellets, are more effective in a given period of time for the removal of residual solvent. Thus, the particular treatment for removal of residual solvent may be an important factor in determining the maximum period of time of contact of solvent and proteinaceous material.

In another preferred embodiment of the process of the invention, the fraction separated from the solvent is pelletized prior to being treated for removal of residual solvent.

The present invention is illustrated by the following examples.

EXAMPLE I

A sample of dehulled water-extracted rapeseed labeled "Tower Fri-76-8 (77-23)" was obtained from the Food Research Institute in Ottawa.

A 10 g sample of the rapeseed that had been comminuted by passing three times through a roller mill was admixed with 100 ml of hexane at a controlled extraction temperature. After a period of time at the extraction temperature, the admixture was poured onto a 200 mesh TYLER ® screen. The portion of the admixture passing through the screen was filtered under vacuum to separate the solid material. The collected solids were then removed from the filter and subjected to a vacuum of 1.1 kPa in a vacuum oven at 80° C. for various periods of time.

The solids thus obtained were analyzed for residual solvent. The technique used for analyzing for residual solvent in this example and those following was as follows:

Approximately 100–120 mg of the solids were weighed and placed in a glass tube which was then plugged with glass wool. The glass tube was placed in a CHROMALYTICS ® 1047 concentrator attached to a VARIAN ® Series 2700 gas chromatograph. The concentrator was programmed to heat the sample for 10 minutes at 195° C. during which time any volatile material was collected on a PORAPAK ® Q column in the concentrator. Subsequently, the column was heated to 210° C. and the amount of volatile matter was analyzed using the gas chromatograph. The gas chromatograph was calibrated using solutions of hexane in methanol. The error in the measurements is believed to be about ±10%.

The results obtained were as follows:

| Extraction Time (min) | Extraction Temp. (°C.) | Residual Hexane (ppm) | | |
|---|---|---|---|---|
| | | After 15 minutes | After 60 minutes | After 1440 minutes |
| 15 | 20 | 29 | 30 | 6 |
| 60 | 20 | 43 | 19* | 8 |
| 15 | 50 | 137 | 146 | 50 |
| 60 | 50 | 226 | 186 | 96 |

*time was 90 minutes.

The results show that the residence time in the solvent, the temperature of the solvent and the time of treatment for removal of residual solvent affect the level of residual solvent.

EXAMPLE II

The procedure of Example I was repeated using an unextracted sample of soya bean flakes that had been knife ground prior to use instead of being passed through a roller mill. In addition, the sample was filtered under vacuum without being screened using the TYLER ® screen:

| Extraction Time (min) | Extraction Temp. (°C.) | Residual Hexane (ppm) | | |
|---|---|---|---|---|
| | | After 15 Minutes | After 60 minutes | After 1440 minutes |
| 16 | 20 | 29 | 19 | 10 |
| 60 | 20 | 48 | 30 | 15 |
| 16 | 50 | 245 | 218 | 217 |
| 60 | 50 | 314 | 274 | 176 |

The results show that the residence time in the solvent, the temperature of the solvent and the time of treatment for removal of residual solvent affect the level of residual solvent.

EXAMPLE III

A sample of rapeseed was comminuted in a small coffee mill for 30 seconds. A 10 g sample of the comminuted rapeseed was admixed with 100 ml of hexane for one minute at a controlled temperature. The admixture was then centrifuged and the miscella decanted off. The solids obtained were admixed with 100 ml of fresh hexane and the resultant admixture was poured onto a 200 mesh TYLER ® screen. The portion of the admixture passing through the screen was filtered under vacuum to separate the solid material. The collected solids were then removed from the filter and subjected to a vacuum of 7 kPa in a vacuum oven at 80° C. for one hour. The solids thus obtained were analyzed for residual solvent.

The results were as follows:

| Extraction Time (min) | Extraction Temp. (°C.) | Residual Hexane (ppm) |
|---|---|---|
| 15 | 20 | 19 |
| 60 | 20 | 15 |
| 15 | 50 | 38 |
| 60 | 50 | 81 |

The results show that both the residence time in the solvent and the temperature of the solvent affect the level of residual solvent.

EXAMPLE IV

The procedure of Example III was repeated using soya beans instead of rapeseed.

The results were as follows:

| Extraction Time (min) | Extraction Temp. (°C.) | Residual Hexane (ppm) |
|---|---|---|
| 15 | 20 | 13 |
| 60 | 20 | 14 |
| 15 | 50 | 60 |
| 60 | 50 | 133 |

The results show that the residence time in the solvent and the temperature of the solvent affect the level of residual solvent.

I claim:

1. An improvement in the process for control of the amount of residual solvent in comminuted proteinaceous material selected from the group consisting of soya beans and rapeseed, in which the comminuted proteinaceous material is admixed with a hydrocarbon solvent for oil in the material and at least a fraction of the proteinaceous material is separated from the solvent and treated for removal of residual solvent, in which the improvement is characterized by:
   (a) maintaining the temperature of the admixture of proteinaceous material and solvent in the range of 0°–35° C.; and
   (b) controlling the period of time of contact of solvent and proteinaceous material to a minimum practical time needed to de-oil the material and to accomplish any separation of the material into fractions and the period of time of treatment for removal of residual solvent to a range of 5 to 500 minutes, whereby separation of a product having a level of residual solvent less than 60 ppm may be effected.

2. The process of claim 1 in which the hydrocarbon solvent is selected from the group consisting of pentane, hexane, heptane and cyclohexane, and mixtures thereof.

3. The process of claim 2 in which the period of time of contact of solvent and proteinaceous material is less than 120 minutes.

4. The process of claim 2 in which the period of the time of treatment for removal of residual solvent is in the range of 5 to 100 minutes.

5. The process of claim 2 in which the product has a level of residual solvent of less than 30 ppm.

6. The process of claim 2, claim 3 or claim 4 in which, in the treatment for removal of residual solvents, the fraction of proteinaceous material is contacted with steam.

7. The process of claim 2, claim 3 or claim 4 in which, in the treatment for removal of residual solvent, the fraction of proteinaceous material is contacted with vacuum.

8. The process of claim 2, claim 3 or claim 4 in which the fraction of proteinaceous material has a protein content of greater than 50%.

9. The process of claim 2, claim 3 or claim 4 in which the proteinaceous material is soya beans or matter derived therefrom.

10. The process of claim 2, claim 3 or claim 4 in which the proteinaceous material is rapeseed or matter derived therefrom.

11. The process of claim 2, claim 3 or claim 4 in which the solvent is hexane.

12. The process of claim 2, claim 3 or claim 4 in which the treatment for removal of residual solvent is carried out on a fraction of proteinaceous material that is in the form of pellets.

* * * * *